(12) United States Patent
Gerber

(10) Patent No.: US 6,214,222 B1
(45) Date of Patent: Apr. 10, 2001

(54) METHOD AND APPARATUS FOR TREATING LIQUID

(76) Inventor: Ulrich Gerber, Bayernstrasse 20, D-91052 Erlangen (DE)

( * ) Notice: Subject to any disclaimer, the term of this patent is extended or adjusted under 35 U.S.C. 154(b) by 0 days.

(21) Appl. No.: 09/205,065

(22) Filed: Dec. 4, 1998

(30) Foreign Application Priority Data

Jul. 6, 1998 (DE) .............................. 198 30 132

(51) Int. Cl.[7] .................................................. C02F 1/00
(52) U.S. Cl. .................. 210/199; 210/205; 210/256; 210/258; 422/236; 422/243; 422/291; 204/666
(58) Field of Search ................. 210/198.1, 199, 210/205, 252, 256, 258; 422/236, 243, 291; 204/660, 666

(56) References Cited

U.S. PATENT DOCUMENTS

| 4,604,362 | * | 8/1986 | Park et al. ........................... 422/64 |
| 4,655,918 | * | 4/1987 | Eertink ................................ 210/199 |

FOREIGN PATENT DOCUMENTS

| 672386 | 11/1989 | (CH) . |
| 2131879 | 1/1973 | (DE) . |
| 2131878 | 2/1973 | (DE) . |
| 0689774 | 1/1996 | (EP) . |
| 1367515 | 6/1964 | (FR) . |
| 2431461 | 2/1980 | (FR) . |
| 2462837 | 2/1981 | (FR) . |
| 9817584 | 4/1998 | (WO) . |

* cited by examiner

Primary Examiner—David A. Simmons
Assistant Examiner—Betsey Morrison Hoey
(74) Attorney, Agent, or Firm—Volpe and Koenig, P.C.

(57) ABSTRACT

Disclosed is a process and apparatus for treatment of liquid. Liquid is introduced into a reaction vessel (10) and rises inside a first chamber (12) of the reaction vessel (10). The liquid is led out of the first chamber (12) downwardly along an outer surface (40) of the first chamber (12) in a thin film into a second chamber (14). In a third chamber (16) energy for raising the internal energy of the liquid is supplied to the liquid by means of an energy supply device (30). The treated liquid is withdrawn from the reaction vessel (10). The energy supply device includes an ultrasound-emitting transducer in which a piezoceramic disc (82) is supported via an elastic seal (84) between a pot-shaped housing member (78) and a sleeve (80).

31 Claims, 4 Drawing Sheets

METHOD AND APPARATUS FOR TREATING LIQUID

Figure 1:
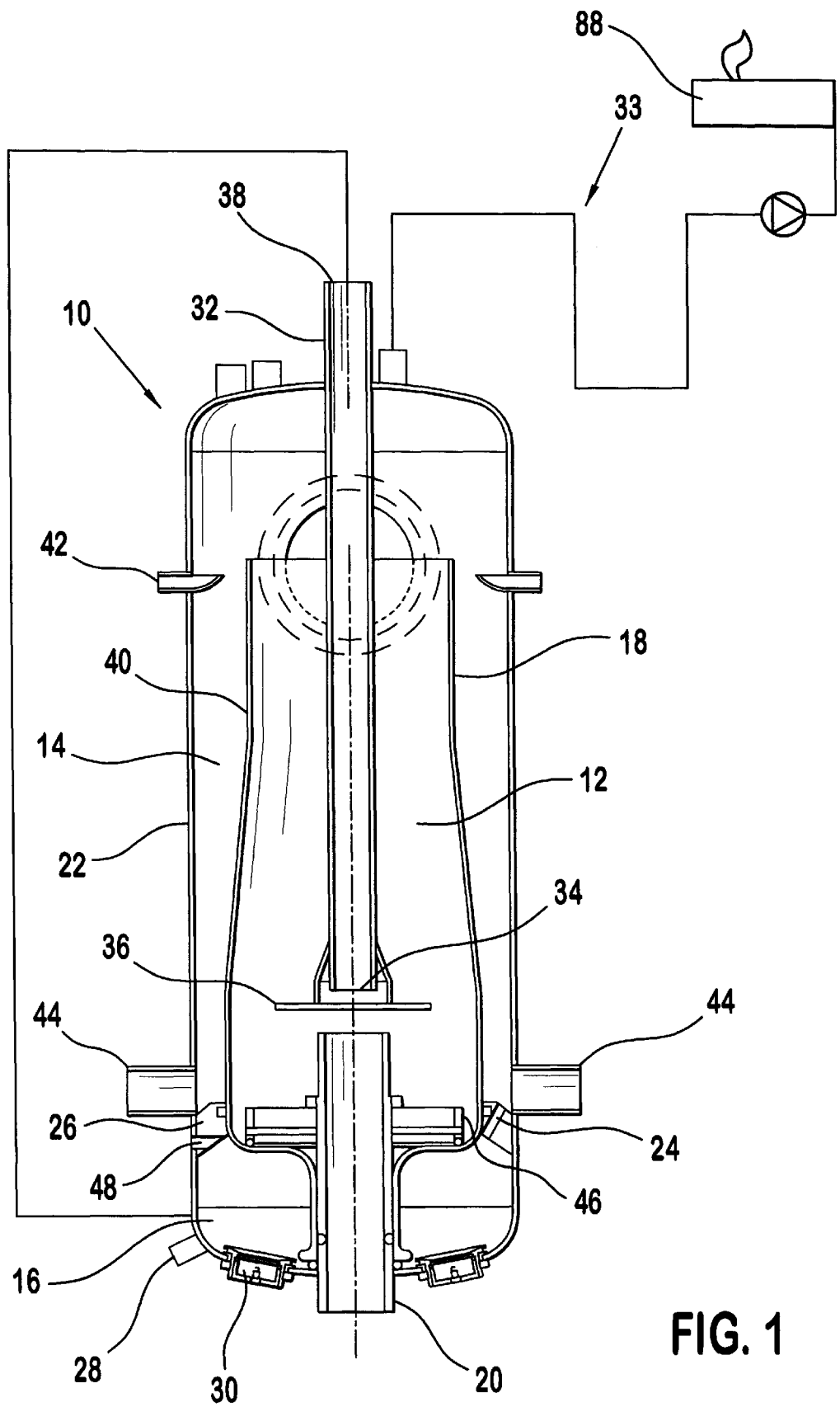

The invention relates to a method and apparatus for treating liquid and an energy supply system appropriate therefor.

From the prior art, processes are known by means of which liquids, and particularly liquids with dissolved materials or undissolved solid components, or fluids dispersed in a liquid are treated in order to subsequently supply them to conventional industrial installations for use in a production process or to introduce them into biologic sewage treatment facilities in practical usage.

Also known are waste water treatment processes for demineralizing or defoaming waste water. The so-treated waste water is utilized, for example, as process water for industrial purposes or for irrigating hydroponic plant nurseries.

However, these processes require a very high input of apparatus and control technology and thereby impose high investment costs.

One of these known processes relates to the dewatering and drying and subsequent burning of sewage sludge or of fecal matter. In so doing the fecal matter, for example liquid pig manure, is collected in relatively large storage installations in which the fecal matter is treated with biological media in such a way that it is thickened and decomposed by biological processes.

An additional use for the fecal matter, which is created in large quantities in large-scale farming operations, is to distribute the fecal matter as fertilizer over agricultural areas such as grain fields or the like.

A disadvantage is that the applying of the fecal matter to the agricultural areas causes a strong odor to be created in the vicinity and, furthermore, that the germs and bacteria contained in the feces enter the soil and the groundwater. In the processes for dispersing or disposing of feces which are known from the prior art, a large space is required for the dispersal or disposal installations and the reprocessing which accompanies it requires long processing times as well as cost-intensive ingredients.

Accordingly the object of the present invention is to provide an apparatus and process for the treating of liquid, by means of which liquid can be treated in a low cost manner and with low space requirements. In addition, an energy supply system especially suited for that purpose is to be described.

This object is achieved in accordance with the invention by the steps and characteristics which are set forth below.

The process according to the invention provides that the liquid to be treated is introduced into a first chamber and then downwardly, along an outside surface of the first chamber, as a thin film into a second chamber. By so doing there can take place in the thin layer a degassing of the liquid to be treated. In so doing, it is desirable that high efficiency be achieved and that the degassing in the thin film provides low cost degassing because no mechanical energy needs to be supplied to the liquid to be treated, unlike in the processes known from the prior art which utilize mechanical stirring for degassing.

By equipping the inventive embodiment of the apparatus with at least three chambers arranged in sequence within a reaction vessel, high throughput is achieved in a small space. Thus the reaction vessel can advantageously be made mobile for certain uses and throughput quantities, by mounting the reaction vessel on a vehicle trailer, thereby enabling it to be driven from one place of utilization to the next.

It is also advantageous that the apparatus can be used for separating immiscible liquids based on density differences of the liquids. Likewise the apparatus according to the invention is suitable for separating liquids which contain undissolved solids.

The liquid to be treated is introduced into the reaction vessel by an input device, rises within the first chamber and is then led via a second chamber into a third chamber. In so doing, it is advantageous that the liquids to be separated, or the solids contained in the liquid to be treated, separate from each other during the rise based on their density differences and that, in the second chamber adjoining the first chamber, liquid components not previously separated undergo additional separation from each other.

To obtain a further improvement in the efficiency of the apparatus embodying the invention, an energy supply device for raising the internal energy of the liquid is connected to the third chamber. By supplying energy to the liquid to be treated, treatment processes can be advantageously accelerated, in that, for example, the temperature of the liquid to be treated is raised or the liquid to be treated is supplied with motion-producing energy for mixing or degassing.

The liquid to be treated is drawn into the reaction vessel by a device connected to the first chamber for creating reduced pressure inside the reaction vessel. This favorably reinforces treatment processes because, for example, due to the reduced pressure, the process temperatures are lower than at ambient pressure.

The inventive energy supply apparatus according to claim 31 preferably includes an ultrasound transducer having two pot-shaped housing members nestled inside each other, which support between them a piezoceramic disc via an elastic seal. With this energy supply apparatus it is simple to supply, to a liquid to be treated, energy, or internal energy, whereby mixing processes are advantageously improved.

Preferred embodiments of the invention are the subject matter of the dependent claims.

In one embodiment of the inventive apparatus there can be provided in the first chamber a submerged pipe which extends into the vicinity of the outlet of the first inlet device. This makes it possible to drain a given portion of the liquid to be treated from the reaction vessel right from the first chamber, before its entry into the second chamber.

It is particularly advantageous to provide, between the first outlet of the submerged pipe and the outlet of the first inlet device, a plate which distributes the liquid emerging from the first inlet device annularly within the first chamber. This prevents the liquid to be treated, which is introduced into the first chamber by the first inlet device, from being immediately drained from the first chamber via the submerged pipe without having been exposed to the treatment process in the first chamber. The liquid entering the first chamber through the first inlet device is guided by the plate past the first outlet of the submerged pipe and flows initially in the direction of the second chamber. By drawing off a portion of the liquid to be treated by means of the submerged pipe, a circulatory flow is created in the first chamber which greatly increases the dwell time of the liquid to be treated inside the first chamber.

In a further embodiment of the invention, the submerged pipe can have a second outlet which is connected to the third chamber. In that case the submerged pipe forms a kind of by-pass for the second chamber, by which the liquid to be treated can be introduced from the first chamber into the third chamber. Moreover, the portion of the liquid to be treated which is guided past the second chamber can be supplied to a different device for a further treatment process.

In an additional embodiment of the invention there can be provided, below the upper end of the first chamber, a device for removing relatively light substances from the reaction vessel. In this way, it is easy to remove from the reaction vessel relatively light substances right after the first chamber.

In an especially preferred embodiment of the invention the interior wall can have a diminishing cross-section in the direction of flow and terminate spaced-apart from an oppositely-located end of the reaction vessel. In this way, the rise of the liquid to be treated is advantageously improved due to the cross-sectional narrowing of the interior wall. If the reaction vessel is provided with a dispersing device connected, upstream, to the first chamber for introducing fluid into the liquid and for its at least partial foaming, the reactive interface between the liquid to be treated and the supplied fluid can be drastically enlarged, so that the desired treatment processes occur within shorter processing times.

The liquid is preferably drawn into the reaction vessel through the low pressure-creating apparatus which is connected to the first chamber opposite to the first inlet direction, whereby there are reinforced the above-described foaming processes and a rise in the liquid or in the foamed portion of the liquid to be treated within the reaction vessel.

The foamed portion of the liquid to be treated becomes defoamed with increasing reaction time and reaches the second chamber, together with the unfoamed portion of the liquid, via an annular space in which the unfoamed portion and defoamed portion of the liquid are mixed together before entry into the third chamber. In this way, there is advantageously achieved an acceleration of the treatment processes during subsequent concentration equalization of the liquid to be treated after its exit from the first chamber, through enlargement of the reactive interface.

In a preferred embodiment of the invention, additional fluids can be introduced into the liquid to be treated in the third chamber. In so doing, the reactive interface between the liquid to be treated and the additional supplied fluids is advantageously achieved for accelerating additional treatment processes. To this end, the third chamber is connected to a second inlet device for introducing additional fluids into the liquid to be treated. It has proven to be particularly advantageous to introduce oxidizing and/or reducing media, preferably ozone and/or hydrogen peroxide.

If the second chamber is divided into an inner and outer annular chamber by an additional partition, there is advantageously achieved a quieting-down zone, in which there can occur a concentration equalization or a mixing of unfoamed liquid and defoamed liquid.

In one embodiment of the invention, the energy supply apparatus for enhancing the internal energy uses ultrasound transducers, in order to nucleate the fluids supplied via the second supply device within the liquid to be treated and to strongly increase the reactive interface.

In order to be able to separate substances which are difficult to separate from the liquid to be divided, with lowest possible energy consumption, the third chamber can be subdivided by a semipermeable partition into a first and a second partial chamber. In a particularly preferred embodiment the energy supply device is connected to the first partial chamber and the connection between the second and the third chamber opens into the first partial chamber of the third chamber. In that case, the energy supply device or the energy introduced by it into the liquid to be treated is used to transport the liquid to be treated through the semipermeable partition, and to extract, from the first partial chamber, those substances to be separated which cannot pass through this semipermeable partition while drawing the liquid out of the reaction vessel from the second partial chamber.

The semipermeable partition can be made of a plastic foil which retains solids in the first partial chamber and allows liquid to pass into the second partial chamber. This enables separation of the liquid from solids contained therein, without requiring high energy as is the case for thermal separation processes.

The principles of exemplary embodiments of the invention are described in what follows with reference to the drawings.

Figure 2:
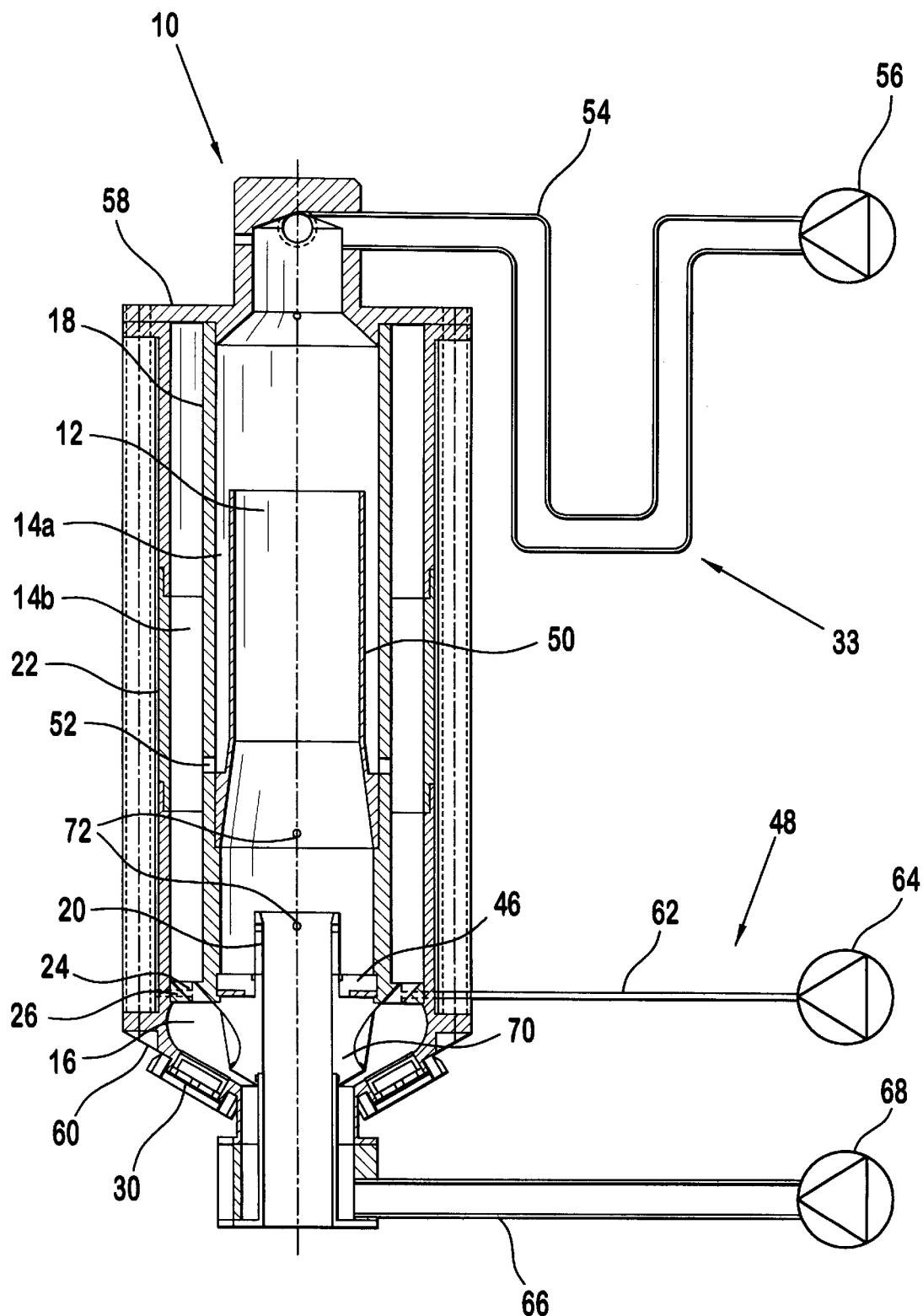
Figure 3:
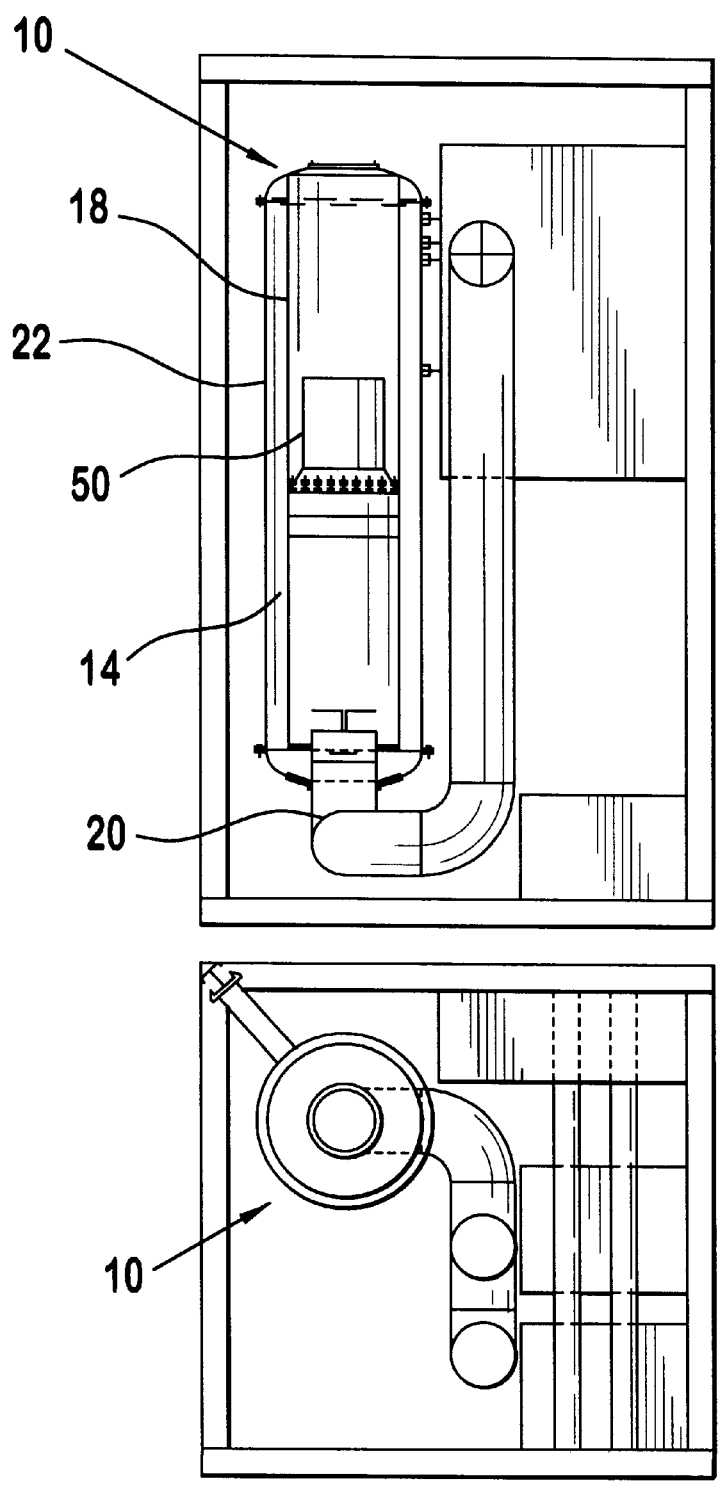
Figure 4:
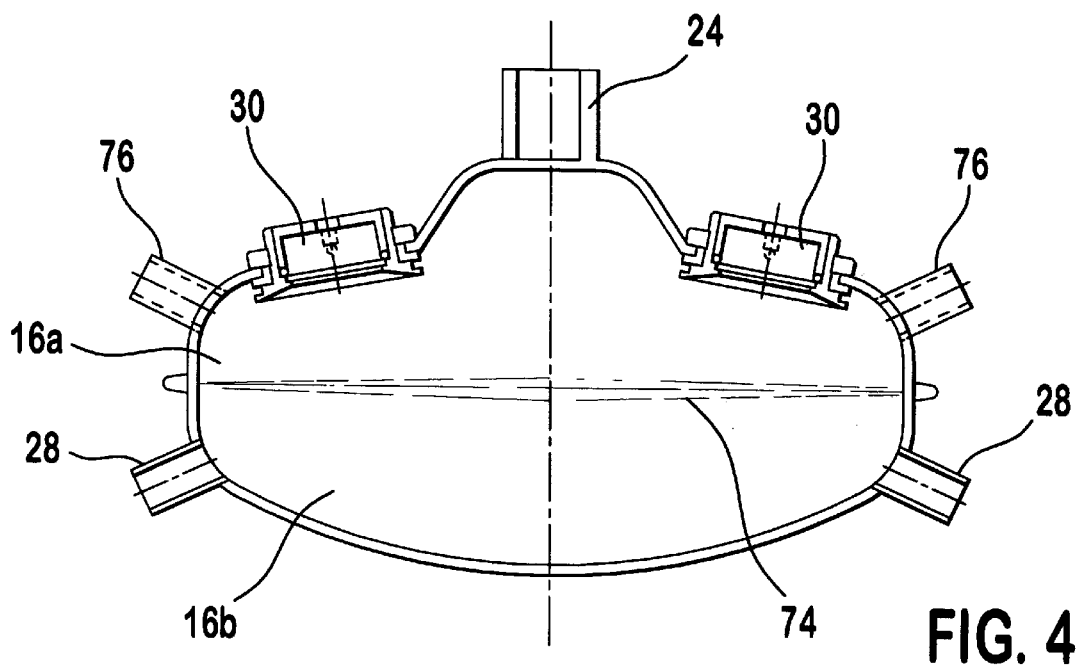
Figure 5:
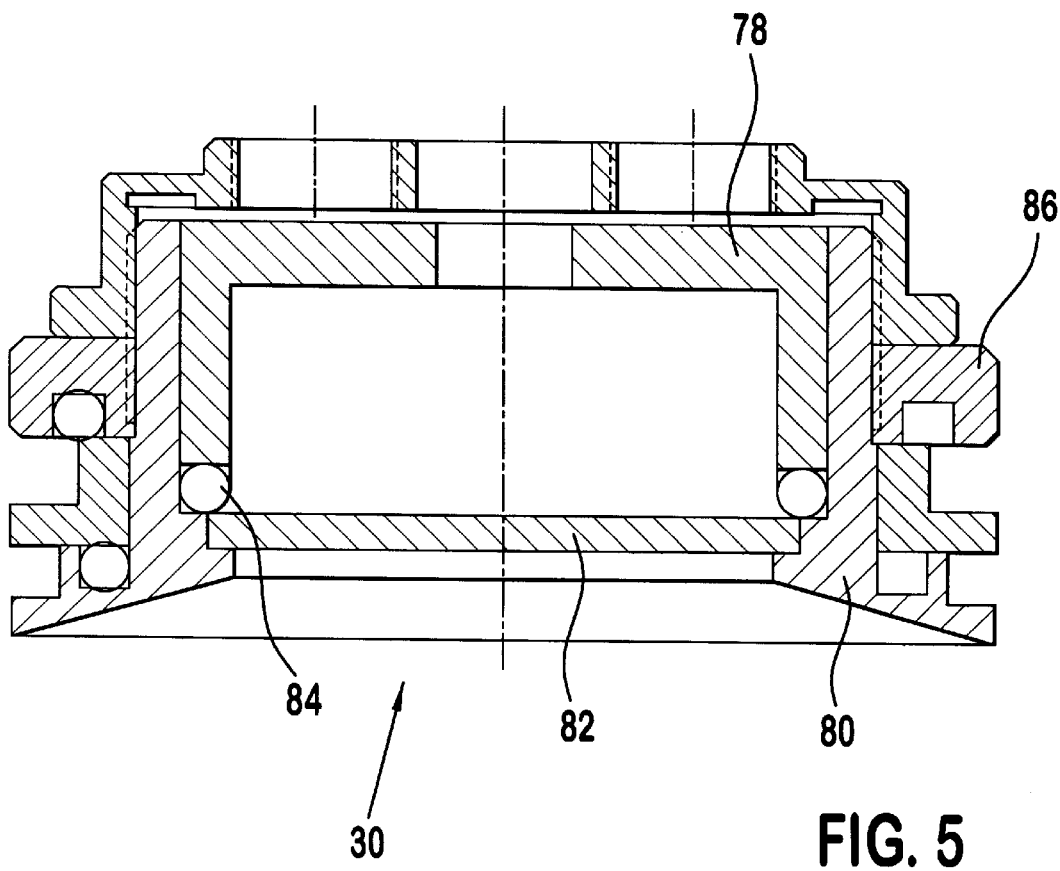

There is shown in:

FIG. 1 a diagrammatic illustration of apparatus according to the invention in which a submerged pipe opens into a first chamber;

FIG. 2 a diagrammatic illustration of a further embodiment of the apparatus of FIG. 1, in which a second chamber of the reaction vessel is subdivided into two ring-shaped chambers;

FIG. 3 a further embodiment of the apparatus of FIGS. 1 and 2;

FIG. 4 a diagrammatic illustration of a third chamber of the reaction vessel, which is divided by a semipermeable partition into a first and second partial chamber; and FIG. 5 a cross-section of an energy supply apparatus.

FIG. 1 shows a diagrammatic illustration of the apparatus, which includes a reaction vessel 10 having three serially arranged chambers 12, 14 and 16. The first chamber is surrounded by an interior wall 18. In addition, there is connected to the first chamber 12 a first inlet device 20 for introducing liquid to be treated into the reaction vessel 10 or the first chamber 12.

The second chamber 14 is positioned between the interior wall 18 and exterior wall 22 and is connected to the third chamber 16. The second chamber 14 is separated from the third chamber by a collar 26 provided with slots or holes 24. The collar 26 is located between the interior wall 18 and the exterior wall 22.

The third chamber 16 has a device 28 for withdrawing the liquid. In addition, there is connected to the third chamber 16 an energy supply device 30 for raising the internal energy of the liquid to be treated.

Opposite the first inlet device 20, there is connected to the first chamber 12 a device 33 for creating reduced pressure within the reaction vessel 10.

The liquid to be treated is introduced, through creation of reduced pressure within the reaction vessel 10, into the first chamber 12 via the first inlet device 20 and rises in that chamber until it reaches the end of the interior wall 18 which is opposite the first inlet device 20, and enters the second chamber 14 via the outer surface 40 of the interior wall 18.

Within the first chamber 12 there extends a submerged pipe 32 up to near the mouth of the first inlet device 20, a plate 36 being located between a first opening 34 of the submerged pipe 32 and the mouth of the first inlet device 20 for distributing the liquid emerging from the first inlet device 20 annularly within the first chamber 12.

The plate 36 prevents the liquid exiting from the mouth of the first inlet device 20 from flowing directly into submerged pipe 32 and being removed from the first chamber 12. The liquid flows from the first inlet device 20 in the direction of the interior wall 18 past the plate 36 and along submerged pipe 32 in the direction toward the end of the first chamber 12 facing away from the first inlet device 20.

A second opening 38 of submerged pipe 32 is connected, in the present exemplary embodiment, with an unillustrated pump by means of which liquid is withdrawn from the first chamber through the submerged pipe 32. This withdrawal produces a circulatory flow within the first chamber which enhances the dwell time of the liquid in the first chamber 12. The second opening 38 of submerged pipe 32 is connected to the third chamber 16.

The interior wall 18 diminishes in cross-section in the flow direction of the liquid and terminates spaced-apart from an oppositely positioned end of the reaction vessel 10.

The liquid is guided from the first chamber 12 downwardly along the outside surface 40 of the interior wall 18 or the first chamber 12 as a thin film into the second chamber 14. In so doing paints or lacquers, for example, which have air or gas occlusions, can be readily out-gassed from the thin layer.

In the region of transition from the first chamber 12 to the second chamber 14 there is located a first device 42 for removal of light substances from the reaction vessel 10. If the fill level of the second chamber 14 is so adjusted that this fill level corresponds at least to the height of the opening of the first device 42, then the relatively light substances floating on the liquid to be treated, e.g. cellulose particles from liquid pig manure or oils from demixed water-oil mixtures, can be readily withdrawn from the reaction vessel 10.

Another possible way to remove solid components from the liquid to be treated is to provide sieves (not shown) prior to entry into the third chamber 16 ahead of the collar 26 and to remove the solid components from the reaction vessel 10 or the second chamber 14 by means of a second device 44.

The first inlet device 20 is coaxially surrounded by the third chamber 16 and connected to the interior wall 18 and the exterior wall 22.

Upstream in the first chamber 12 there is connected a dispersing device 46 for introducing fluid into the liquid and for at least partial foaming thereof.

In certain applications or treatment processes, fluids such as air or pure oxygen are introduced into the liquid via the dispersing device 46. In so doing, there is created in an upper region of the first chamber 12 located at the transition to the second chamber 14, a region which is filled with foamed liquid. Through this foaming there is achieved a substantial increase in the reactive interface between the liquid and the supplied fluids, whereby the reaction rate of the treatment processes is substantially increased. With increasing reaction time the surface tension of the foamed portions of the liquid decreases, so that the foamed liquid can again be defoamed and drawn off into the second chamber 14. To the third chamber 16 there is connected a second inlet device 48 for introducing additional fluids into the liquid. Through this second inlet device 48 there are supplied oxidizing and reducing media for treatment of liquid pig manure. This includes hydrogen peroxide and/or ozone. These two fluids have the advantage that liquid pig manure can be treated without forming harmful residues. Therefore, no harmful residues need to be removed from the liquid pig manure after treatment.

FIG. 2 is a diagrammatic illustration of a further embodiment of the apparatus of FIG. 1, in which the second chamber 14 of the reaction vessel 10 is subdivided into two annular partial chambers 14a and 14b. Because the embodiments of the apparatus illustrated in FIGS. 1 and 2 differ only slightly from each other, the same reference characters are used for components having the same functions.

The liquid enters the first chamber 12 via the first inlet device 20. Via the dispersing device 46, which takes the form of a porous ring of stone in the present embodiment, air or pure oxygen is introduced into the liquid. This causes foaming of the liquid in the first chamber 12. The foamed liquid is again defoamed and flows via the inner annular chamber 14a into the outer annular chamber 14b. The inner annular chamber 14a is confined by an additional wall 50 and the interior wall 18. The porous stone is made of foamed silicon nitride.

In an additional embodiment, not illustrated, the additional wall 50 can be provided with holes so that the unfoamed liquid present inside the additional wall 50 is able to flow into the inner annular chamber 14a through these holes.

The inner annular chamber 14a and the outer annular chamber 14b are connected through holes 52 in the interior wall 18. The inner annular chamber 14a is provided as an additional quieting-down and mixing zone for the foamed and subsequently again defoamed liquid. In addition, there takes place a concentration equalization between the defoamed and the unfoamed portions of the liquid in the inner annular space 14a and the adjoining outer annular space 14b.

The device 33 for creating reduced pressure in the reaction vessel 10 includes a pipe 54 and a pump 56, the pipe 54 having a separator or siphon and an outlet element (not shown) located in the vicinity of the separator for settled-out solid particles.

The exterior wall 22 is formed of several interconnected cylindrical sections which are located one inside the other and firmly connected with a lid 58 and bottom 60 of the reaction vessel 10 by laterally positioned clamping means (not further illustrated).

The second inlet device 48 includes, in the illustrative example according to FIG. 2, a pipe 62 and a pump 64 for introducing fluids into the third chamber 16. In addition, an oxygen-generating apparatus can also be connected to pipe 62 of the second inlet device 48.

The device 28 for withdrawing the liquid to be treated from the reaction vessel 10 partly encloses the first inlet device 20 and opens up into a pipe 66 which is connected to an additional pump 68. Via pump 64 of the second inlet device 48 and pump 56 of the device 33 for creating reduced pressure within reaction vessel 10, reduced pressure is centrally set in the reaction vessel 10 by means of a control device (not shown), whereby a suction effect is exerted upon the liquid to be treated.

The energy supply device 30 has ultra sound transducers by means of which fluids supplied through the second inlet device 48 are nucleated in the liquid. In order to the able to direct the ultrasound energy into the third chamber 16, an offset reflector 70 made of glass is provided in the third chamber 16. In both the first chamber 12 and the region of the outlet of the first inlet device, a sensor 72 is located which supplies the central control system for maintaining a fill level by means of the appropriate control signals.

The fluids exiting via pipe 54 are supplied to a mixing container and are then again introduced into the reaction vessel 10 through the first inlet device 20. Depending upon which fluids are introduced into the liquid through the dispersng device 46 via the second inlet device 48, different treatment processes can be performed. For example, by supplying hydrogen peroxide and/or ozone, nutrient solutions used for watering of hydroponic cultures in commercial plant nurseries can be freed of germs readily, inexpensively, and with low space requirements.

FIG. 3 shows a further embodiment of the apparatus in a side (elevation) view and in a top view. In a prototype of the apparatus, the reaction vessel 10 illustrated in FIG. 3 was 3 m high and required a floor space of 1.6 m by 1.6 m, for a throughput of 6 m³ of liquid per hour. Ozone, hydrogen peroxide and oxygen is introduced into the reaction vessel 10. A apparatus with this reaction vessel 10 can replace the sewage treatment plant of a medium sized village. An additional field of use consists of animal farms, in which relatively large quantities of fecal matter are produced. The treatment of coolant and lubricating material for machine tools also constitutes an application for the apparatus. There, water-oil-solid particle are to be separated from each other.

Water-oil mixtures also occur, for example, in relatively large quantities in hardening shops where, or example, a steel wire to be hardened is first cooled in an oil bath and then passed through water, whereby this cooling water becomes so contaminated with the oil that it has to be treated.

A further potential application consists, for example, in separating cream from milk and so separating whey. In so doing, nitrogen is introduced into the milk via the dispersing device 46 so that there is produced in the first chamber 12 a cream foam which is removed from the reaction vessel 10 via the second chamber 14 and the third chamber 16. The introduced nitrogen is removed from the reaction vessel 10 by the device 33 used to create reduced pressure.

FIG. 4 shows the third chamber 16, which is subdivided by a semipermeable partition 74 into a first partial chamber 16a and a second partial chamber 16b. The energy supply device 30 is connected to the first partial chamber 16a, which is connected to the second chamber 14 by a connection 24 of slots or holes between the second chamber 14 and the third chamber 16. The semipermeable partition 74 is a plastic foil, which retains solids inside the first partial chamber 16a and lets the liquid pass through into the second partial chamber 16b. The first partial chamber 16a has an outlet 76 for the retained solids and the second partial chamber 16b is provided with the device 28 for removing the liquid from the third chamber 16 and thereby from the reaction vessel 10.

In FIG. 5 there is illustrated the energy supply device 30 for raising the internal energy of the liquid, which, in the present exemplary embodiment uses ultrasound transducers, each with a pot-shaped housing member 78. Between a sleeve 80 and the pot-shaped housing member 78 there is placed a piezoceramic disc 82 which abuts via an elastic seal 84 against the pot-shaped housing member 78 and is clamped by means of a clamping device 86 between the housing member 78 and the sleeve 80.

In the present illustrative embodiments the reaction vessel 10 is made of stainless steel. However it is w thin the province of one skilled in the art to also make the reaction vessel 10 of other materials suitable for the respective application, such as glass or plastic.

Because the chambers 12, 14, 16 and the first inlet device 20, which is shaped like a pipe, are positioned coaxially with respect to each other, the reaction vessel 10 has minimum external dimensions.

According to FIG. 1, a device 88 connected after pump 56 is illustrated for receiving and utilizing reusable fluids exiting from the reaction vessel.

LIST OF REFERENCE CHARACTERS 10 reaction vessel
12 first chamber
14 second chamber
14a inner annular chamber
14b outer annular chamber
16 third chamber
16a first partial chamber
16b second partial chamber
18 interior wall
20 first inlet device
22 exterior wall
24 slots or holes
26 collar
28 outlet device
30 energy supply device
32 submerged pipe
33 apparatus for creating reduced pressure
34 first outlet from the submerged pipe
36 plate
38 second outlet from submerged pipe 32
40 outer surface of interior wall 18
42 first removal device
44 second removal device
46 dispersing device
48 second inlet device
50 additional wall
52 holes
54 pipe
56 pump
58 lid
60 bottom
62 pipe
64 pump
66 pipe
68 pump
70 offset reflector
72 sensor
74 semipermeable partition
76 outlet from first partial chamber 16a
78 housing member
80 sleeve
82 piezoceramic disc
84 elastic seal
86 clamping device
88 receiving and utilizing device

What is claimed is:

1. Apparatus for treating liquid comprising
   a) at least three chambers (12, 14, 16) located in sequence inside a reaction vessel (10),
   b) having an interior wall (18) which confines the first of the three chambers (12, 14, 16),
   c) an inlet device (20) for the liquid to be treated connected to the first chamber (12),
   d) an exterior wall (22) which confines the second chamber (14) together with the interior wall (18) and which has a connection (24) with the adjoining third chamber (16),
   e) a device (28) for removing the liquid from the third chamber (16),
   f) an energy supply device (30) connected to the third chamber (16) for raising the internal energy of the liquid, and
   g) a device (33) connected to the first chamber (12) opposite the first inlet device (20) for creating reduced pressure inside the reaction vessel (10).

2. Apparatus according to claim 1, characterized in that a submerged pipe (32) extends inside the first chamber (12) into the vicinity of the mouth of the first inlet device (20).

3. Apparatus according to claim 2, characterized-in that, between a first outlet (34) of the submerged pipe (32) and the mouth of the first inlet device (20), a plate (36) is located which annularly distributes the liquid exiting from the first inlet device (20).

4. Apparatus according to claim 3, characterized in that the submerged pipe (32) has a second outlet (38) which is connected to the third chamber (16).

5. Apparatus according to claim 4, characterized by a device (42) located below the upper end of the first chamber (12) as an outlet for substances to be removed from the reaction vessel (10).

6. Apparatus according to claim 1, characterized in that the interior wall (18) diminishes in cross-section in the direction of flow and terminates spaced-apart from a position located opposite the first inlet device (20).

7. Apparatus according to claim 1, characterized by a dispersing device (46) connected upstream to the first chamber (12) for introducing fluid into the liquid and for at least partial foaming thereof.

8. Apparatus according to claim 7, characterized in that the dispersing device (46) takes the form of an annular porous stone.

9. Apparatus according to claim 8, characterized in that the porous stone is made of foamed silicon nitride.

10. Apparatus according to claim 7, characterized in that the first inlet device (20) is a pipe shaped element which is positioned coaxially with respect to the three chambers (12, 14, 16), extends through the dispersing device (46) and projects into the first chamber (12).

11. Apparatus according to claim 1 characterized by a second inlet device (48) connected to the third chamber (16) for introducing additional fluids into the liquid.

12. Apparatus according to claim 1, characterized in that the second inlet device (48) includes a pipe (54) and a pump (56), the pipe (54) terminating in the third chamber (16).

13. Apparatus according to claim 11, characterized in that the additional fluids which are introduced into the third chamber (16) via the second inlet device (48) are oxidizing and/or reducing media.

14. Apparatus according to claim 13, wherein the oxidizing and/or reducing medium is selected from the group consisting of ozone, hydrogen peroxide and combination thereof.

15. Apparatus according to claim 1, characterized in that the energy supply device (30) includes ultrasound-emitting transducers.

16. Apparatus according to claim 1, characterized in that the third chamber (16) surrounds the first inlet device (20).

17. Apparatus according to claim 1, characterized in that the second chamber (14) is divided by means of an additional wall (50) into an inner annular chamber (14a) and outer annular chamber (14b) and that the inner annular chamber (14a) has a connection with the outer annular chamber (14b).

18. Apparatus according to claim 1, characterized in that the third chamber (16) is subdivided by means of a semipermeable partition (74) into a first partial chamber (16a) and a second partial chamber (16b).

19. Apparatus according to claim 18, characterized in that the energy supply device (30) is connected to the first partial chamber (16a) and that the connection (24) between the second chamber (14) and the third chamber (16) opens into the first partial chamber (16a).

20. Apparatus according to claim 18, characterized in that the semipermeable partition (74) is a plastic foil which retains solids in the first partial chamber (16a) and allows liquid to pass into the second partial chamber (16b); and further that the first partial chamber (16a) has an outlet (76) for solids and that the second partial chamber (16b) is provided with the device (28) for removing the liquid from the third chamber (16).

21. Apparatus according to claim 1, characterized in that the reaction vessel (10) is made of stainless steel.

22. Apparatus according to claim 1, characterized in that interior wall (18) has at least one hole (52) which provides a connection to the second chamber (14).

23. Apparatus according to claim 1, characterized in that, between the interior wall (18) and the exterior wall (22), a collar (26) is provided which is located between the second chamber (14) and the third chamber (16) and is provided with slots (24) for passage of the liquid.

24. Apparatus according to claim 1, characterized in that the fluid introduced into the first chamber (12) is air, pure hydrogen, ozone or nitrogen.

25. Apparatus according to claim 1, characterized in that the discharge device (28) is located at least in part coaxially with respect to the first inlet device (20) and includes a pump (68).

26. Apparatus according to claim 1, characterized in that the device (33) for creating reduced pressure includes a pipe (54) and a pump (56), the pipe including a separator or siphon and a discharge element.

27. Apparatus according to claim 26, characterized by a device (88) connected after the pump (56) for receiving and utilizing reusable fluids.

28. Apparatus according to claim 1, characterized in that an offset reflector (70) for ultrasound energy is provided inside the third chamber (16).

29. Apparatus according to claim 1, characterized in that the exterior wall (22) is formed of a plurality of interconnected cylindrical segments.

30. Apparatus according to claim 1, wherein said energy supply device (30) includes an ultrasound-emitting transducer having a pot-shaped housing portion (78) and a sleeve (80) which support between them a piezoceramic disc (82) via an elastic seal (84).

31. Apparatus according to claim 30, including a device (86) for clamping said elastic seal (84).

* * * * *